United States Patent [19]

Mohri et al.

[11] Patent Number: 4,621,417

[45] Date of Patent: Nov. 11, 1986

[54] HYDROGEN-STORED ELECTRODE FOR USE IN BATTERY AND MANUFACTURING METHOD

[75] Inventors: Motoo Mohri; Yoshimitsu Tajima, both of Nara, Japan

[73] Assignee: Sharp Kabushiki Kaisha, Osaka, Japan

[21] Appl. No.: 702,608

[22] Filed: Feb. 19, 1985

[30] Foreign Application Priority Data

Feb. 17, 1984 [JP] Japan .................................. 59-28872

[51] Int. Cl.$^4$ ........................ H01M 4/04; H01M 4/88; C01B 6/24
[52] U.S. Cl. .................................... 29/623.1; 429/101; 423/644; 264/109; 264/122; 264/127
[58] Field of Search ................ 420/900; 429/101, 218; 423/644; 29/623.1

[56] References Cited

U.S. PATENT DOCUMENTS 4,107,405 8/1978 Guegen et al. ...................... 429/218
4,125,688 11/1978 Bonnaterre ........................ 429/218
4,378,331 3/1983 Bruning et al. ..................... 420/900

Primary Examiner—Donald L. Walton
Attorney, Agent, or Firm—Birch, Stewart, Kolasch & Birch

[57] ABSTRACT

The preferred embodiment provides such a hydrogen-stored electrode extremely useful for application to the cathode of alkaline battery. It makes it possible to manufacture such a useful hydrogen-stored electrode molded into electrode form after activation of hydrogen-stored alloy by means of hydrogen generated by immersion of blends into solution, in which the blends is composed of hydrogen-stored alloy and additives that generate hydrogen through their reaction with the above solution.

13 Claims, 4 Drawing Figures

HYDROGEN-STORED ELECTRODE FOR USE IN BATTERY AND MANUFACTURING METHOD

BACKGROUND OF THE INVENTION

The present invention relates to a hydrogen-stored electrode for use in a battery and a method for the manufacture thereof.

In fact, a battery using metal oxide such as Ni-OOH and AgO for the positive electrode and hydrogen for the negative electrode has already been proposed and promoted for early development. There are two kinds of such a battery. One is conventionally called the "high-pressure" type, which causes hydrogen generated during charge to be stored under-compression in a pressure-resistant container in the vapor phase. This however requires an air-tight container which should be perfectly resistant to high pressure, thus creating a problem for development on a commercial basis. The other is the "low-pressure" type, which causes hydrogen generated during charge to be stored as a hydrometallic compound in a hydrogen-stored alloy. Therefore, in principle, the actual pressure resistance needed for the container is determined by the equilibrium dissociation pressure, and yet, it does not require resistance against high pressure, thus providing more potential for early development than the other so-called "high-pressure" type. Actually, two methods are available for manufacturing an electrode (specifically, the negative electrode) using a hydrogen-stored alloy.

The first of these two methods is as follows. First, a hydrogen-stored alloy is compounded by means of a high-frequency furnace for example, and then reduced to powder by mechanical means. To the powder is added alkali-resistant organic high polymers, such as polyethylene or polytetrafluorethylene, which function as cross-linking agents. In addition, some selective conductive powder such as carbon, copper, or nickel may be added as required. The prepared mix is then subjected to compression molding to produce a conductive current collector such as punched metal or foamed metal for example. The molded conductive material is then thermally treated by applying a temperature close to the melting point of the cross-linking agent in an atmosphere of inert gas. As a result, an electrode is produced through such a relatively simple process. Nevertheless, since the hydrogen-stored alloy employed for this electrode was not activated in the initial stage, immediately after the electrode is completed, normally, there is no hydrogen content at all that can be electrochemically made available. In other words, immediately after its birth, no capacitance is provided for such an electrode produced by the above process. It will be provided with a certain capacitance only after more than 10 rounds of charge and discharge have been applied. In addition, such an electrode cannot contain sufficient capacitance throughout its service life.

There is a still further problem to solve. Since the hydrogen-stored alloy is subjected to compression molding without hydrogen content, when hydrogen content is stored during the following charge, the electrode expands its own volume by 10% to a maximum of 20%. As a result, the powdered alloy components drop from the molded piece, while the electrode shape becomes deformed. In addition, the capacitance value itself sharply decreases.

The second method is the following. After mechanically reducing the compounded hydrogen-stored alloy, the powder is stored in a container so that reaction can take place with hydrogen. While heating the interior of the reactive container, vapor is decompressed and discharged.

Next, the content of the reactive container is cooled at room temperature, and then high-pressurized hydrogen gas is fed into the reactive container, causing the hydrogen-stored alloy to absorb hydrogen. Next, the content of the reactive container is again decompressed and discharged to release hydrogen from the hydrogen-stored alloy. Then, high-pressurized hydrogen gas is again fed into the reactive container to allow the hydrogen-stored alloy to absorb hydrogen again. After fully activating the hydrogen-stored alloy by repeating these procedures several times, the activated hydrogen-stored alloy is drawn out of the reactive container, and then, as was done in the first method described earlier, the hydrogen-stored alloy is blended a selected cross-linking agent. Finally, by applying compression molding and thermal treatment to the mix, an electrode can be made up. Note that activation of the hydrogen-stored alloy provides an effect in which a sufficient volume of hydrogen can be easily stored in and discharged from the hydrogen-stored alloy, thus enabling the alloy to remain in a specific condition so that these serial operations can be done repeatedly and continuously. Since the second method causes the hydrogen-stored alloy to be fully activated, the resultant electrode is provided with sufficient capacitance and can be offered for use immediately after being made up. In addition, since the hydrogen-stored alloy has been compression molded in the hydrogenated (activated) condition, i.e., in the expanded condition, an electrode made of this alloy does not cause dissociation of the powder alloy nor deformation of of the electrode throughout the ensuing charge and discharge cycles. An electrode made of this alloy can maintain a specific capacitance provided during the production stage. Despite such advantageous features, the embodiment of the second method requires high-procedure-resistant reactive containers and other equipment during the manufacturing process. Moreover, since the second method also deals with highly pressurized hydrogen gas, large-scale production facilities should be employed, thus unavoidably involving complex operations. Furthermore, since the activated hydrogen-stored alloy contains extremely active elements, ensuing processes should be executed in the inert gas atmosphere. This not only hinders the mass production potential, but also increases production costs. As described earlier, although the first method features a simple production method, it cannot provide an electrode with sufficient electrical characteristics. Conversely, despite satisfactory characteristics of the resultant electrode, the second method still involves an extremely complex production processes. As a result, neither of these methods has been found satisfactory for the manufacture of electrodes.

OBJECT AND SUMMARY OF THE INVENTION

In the light of the disadvantages described above, the present invention aims at providing an extremely useful method of manufacturing hydrogen-stored electrodes ensuring satisfactory electrical characteristics for use in a battery through a simplified method using nascent hydrogen generated by a chemical reaction process. To achieve this, the preferred embodiment provides the following processes. First, selected additives typically including aluminum, nickel, a variety of Laney alloys, etc. that dissolve in a solution containing acid or alkali available for generating hydrogen, are blended into a hydrogen-stored alloy, followed by immersion of these into a solution. The mix solution is stirred well so that the hydrogen-stored alloy can be hydrogenated and activated by nascent hydrogen generated in solution. After rinsing, the hydrogen-stored alloy is eventually molded into electrodes. Hydrogen is generated by chemical reaction of the additives in solution, which is conventionally called "hydrogen in the nascent stage", and this hydrogen is extremely active corresponding to several thousands bars of the atmospheric pressure. Therefore, using the nascent hydrogen, hydrogen-stored alloy can be fully activated in solution within a very short period of time. The preferred embodiment causes the hydrogen-stored alloy to be quickly activated simultaneous with purification of its own surface using the purifying function of the solution itself. The preferred embodiment provides such advantages in which, after being activated, the powder mix can be compressed and molded into electrodes in wet conditions without a drying process. During the molding operation, there is no need to generate an inert gas atmosphere, thus significantly improving the productivity. The molded hydrogen-stored electrode contains sufficient electrical capacitance as a result of the activation. Such a capacitance remains constant and provides quite satisfactory characteristics. In other words, using such a simple production process and associated devices, the preferred embodiment provides such electrodes featuring satisfactory electrical characteristics ideally suited for use in a battery. These electrodes are particularly suited for inexpensive mass production, thus making it possible to stably establish practical production technology for early commercial production of hydrogen-stored electrodes. The preferred embodiment also provides advantageous methods typically comprising the following processes.

First, selected additives including a variety of Laney alloys represented by nickel-aluminum dissolving themselves in such solution containing acid or alkali for generating hydrogen are blended into a hydrogen-stored alloy, followed by immersion of the mix into solution containing a transition metal ionic complex. The mix solution is then stirred well to hydrogenate and activate the hydrogen-stored alloy using nascent hydrogen generated in solution. Such insoluble metals remaining after dissolution and the transition metal yielded from the transition metal ionic complex are both held on the hydrogen-stored alloy. After rinsing, these metals and the hydrogen-stored alloy are integrally molded into an electrode internally storing hydrogen. Hydrogen is generated in solution by chemical reaction of the additives and solution, which is conventionally called "hydrogen in the nascent stage", being extremely active corresponding to several thousands bars of hydrogen gas. Therefore, using the nascent hydrogen, the hydrogen-stored alloy can be fully activated in solution within a very short period of time. Such insoluble metals remaining after dissolution are extremely active, which can be held on the hydrogen-stored alloy. The transition metal ion contained in the transition metal complex can be easily reduced either by the nascent hydrogen or such hydrogen stored in the activated hydrogen-stored metal, thus eventually making up metal particles. These metal particles are also very active, which can be easily precipitated onto and carried by the hydrogen-stored alloy. The preferred embodiment causes the hydrogen-stored alloy to be quickly activated simultaneous with purification of its surface using the purifying function of the solution itself. The preferred embodiment has made it possible to mold the mix powder into an electrode by compression in a wet condition without drying after activating these elements. During the molding process, there is no need to generate the inert gas atmosphere, thus significantly improving productivity. The hydrogen-stored electrode thus completed contains sufficient electrical capacitance as a result of the activation process. In addition, by passing through repeated cycles of charge and discharge for some time, the transition metals located on the hydrogen-stored alloy migrate inside the hydrogen-stored alloy, which eventually spread throughout the entire alloy components. The transition metals effectively absorb and reduce active gas such as oxygen generated by excessive charge so that the hydrogen-stored alloy can be protected from potential hazard caused by active gas. As a result, the hydrogen-stored alloy can adequately and stably maintain a specific amount of hydrogen to be absorbed and discharged during a long-term service period. In addition, the presence of such transition metals makes it possible to enlarge the contact area between the hydrogen-stored alloy and the current collector elements. This improves the polarization characteristics and promotes effective use of materials. In other words, using such simple production processes and associated equipment, the preferred embodiment provides advantageous electrodes featuring satisfactory characteristics ideally suited for use in a battery. These electrodes are particularly suited for mass production at low cost, thus making it possible to stably establish practical production technology for an early commercial production of the hydrogen-stored electrodes.

DETAILED DESCRIPTION OF THE PREFERRED EMBODIMENTS

Figure 1:
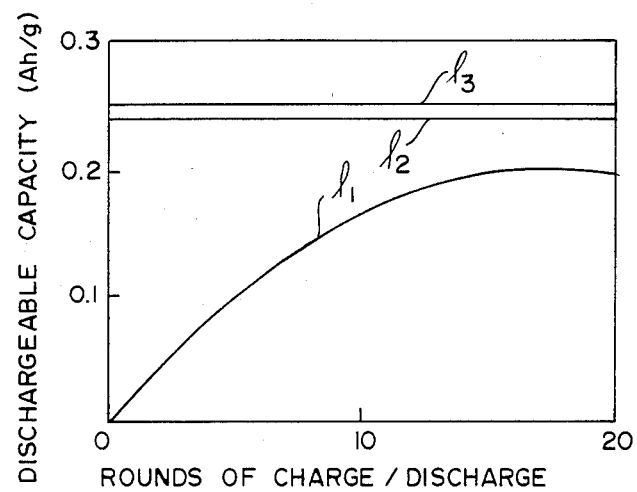
FIG. 1 shows the electrical characteristics relative to the number of the charge-and-discharge cycles and the dischargeable capacitance of the hydrogen-stored electrode.

Japanese Patent Laid-Open No. 91736 of 1982 has disclosed such metals for the hydrogen-stored alloy, which include elements that can be easily bonded with hydrogen, typically Ca, Mg, Ti, Zi, Hf, V, Nb, Ta, Y, or lanthanide. Conventionally, such alloys composed of these elements shown above and those which can be hardly bonded with hydrogen, typically such as Al, Cr, Fe, Ni, Co, Cu, Mu, and Si, have been employed. In addition, there are a wide variety of elements that generate hydrogen through reaction against a solution containing acid or alkali. Typically, these include independent metal elements each featuring a greater ionization tendency than that of hydrogen such as K, Na, Mg, Al, Fe, Ni, Sn, etc. and a variety of Laney alloys including Ni-Al, Ni-Si, Cu-Al, and others. When blends of the hydrogen-stored alloy powder and Laney alloy for example are immersed and developed in solution, the hydrogen-stored alloy is activated by the nascent hydrogen generated through the reaction of Laney alloys and alkaline solution taking place during development. The activated powder blend is then washed with alkaline solution or conventional water, which is then added a selected bonding agent before being compressed and molded into either punched metal or foamed metal as the current collector element. This process makes it possible to mold by compression the powder blends containing the hydrogen-stored alloy elements in wet conditions without drying them, thus without needing the inert gas atmosphere. The molded object is then placed in the inert gas atmosphere and subjected to a heat treatment by applying a temperature close to the melting point of the bonding agent, and as a result, a hydrogen-stored electrode containing sufficient electrical capacitance is made. Normally, nickel and/or copper activated by the reaction of the developed blends of the hydrogen-stored alloy powder and Laney alloy remains on the surface of the hydrogen-stored alloy particles. Therefore, with reference to the discharge reactions of the cathode shown in the following formulas (1) through (5), it is probable that the activated nickel or copper will promote a specific function so that such hydrogen shown in formula (2) that has diffused itself in a solid phase from the interior of the hydrogen-stored alloy to its surface can be converted into absorptive hydrogen.

H (Interior) Discharge H (Surface)  (1)

H (Surface) Discharge H (Absorption)  (2)

H (Absorption) Discharge $H^+$ (Absorption)+$e^-$  (3)

$H^+$ (Absorption) Discharge $H^+$  (4)

$H^+$ +$OH^-$ Discharge $H_2O$  (5)

As a result, compared to such hydrogen-stored alloy manufactured by conventional processes, the hydrogen-stored alloy embodied by the present invention provides quite satisfactory polarization characteristics, a large amount of reversible hydrogen useful for charge and discharge operations, and yet, loss of capacitance is minimized even when discharge is performed at a considerable rate. Referring now to hydrogen-stored alloy, for example, such as TiNi alloy and a typical additive such as Ni-Al, the method of manufacturing the hydrogen-stored electrode is described in detail below.

For example, first, the TiNi alloy powder each having a maximum particle diameter of 20 microns and the Ni-Al alloy powder each containing 50% by weight of nickel and aluminum are weighed so that the ratio by weight becomes 5:3, and then blend both together. Next, gradually add the prepared mix into a solution containing 30% by weight of potassium hydroxide (KOH) heated at 70° C. and stir it well. Then, aluminum of the nickel-aluminum alloy starts to generate hydrogen fiercely as a result of the reaction taking place according to the formula (6) shown below.

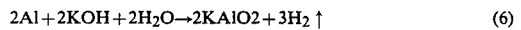

$2Al + 2KOH + 2H_2O \rightarrow 2KAlO_2 + 3H_2 \uparrow$  (6)

Figure 2:
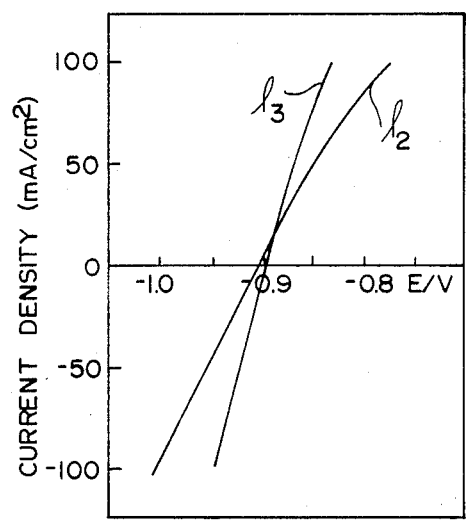
FIG. 2 shows the polarization characteristics of the hydrogen-stored electrode.
Figure 3:
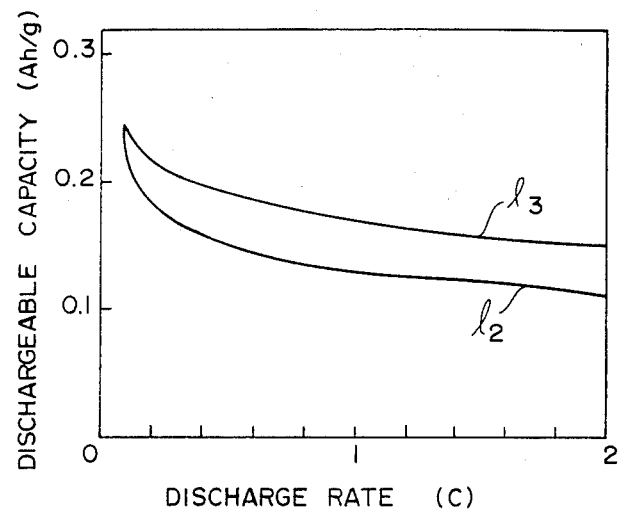
FIG. 3 shows the relationship between the discharged rate and the dischargeable capacitance of the hydrogen-stored electrode.

While holding the solution temperature at 70° C., keep stirring it for 4 hours consecutively. Then, wash the blended object until water-soluble aluminate ion is no longer visible. After rinsing, discharge clean water on the upper part of the solution. Add 8% by weight of polytetrafluorethylene resin powder to the blend as a bonding agent and then mix both well. Then, fill up foamed nickel current collector with the mix blended with bonding agent, and then mold the mix by compression by applying 1MT/cm3 of pressure, followed by the thermal treatment at 300° C. for an hour in an argon atmosphere so that the hydrogen-stored electrode mainly comprised of the TiNi alloy can be eventually produced. The inventors evaluated the electrical characteristics of the hydrogen-stored electrode produced by the above process in the identical electrolytic bath against the reference electrode made of standard mercury oxide. The inventors employed such electrodes made of the TiNi alloy including the one prepared by the conventionally applied first process and the other one made from the second process for comparison. All the requirements including the composition of the TiNi alloy, the amount of the bonding agent, molding pressure, and the heat treatment temperature were arranged exactly identical to those which were applied to the hydrogen-stored electrode embodied by the present invention. FIG. 1 shows the characteristics relative to the number of cycles of the discharge and the dischargeable capacitance after repeatedly charging and discharging electrodes immediately after being completed. Curve $l_1$ represents electrical characteristics of the electrode produced by the conventionally employed first process. Curve $l_2$ represents electrical characteristics of such electrodes made by the conventionally employed second process, whereas the curve $l_3$ represents such electrical characteristics of the electrode processed by the method embodied in the present invention. Actually, the electrode produced by the conventional, first process needed more than 10 rounds of repeated charge and discharge operations before the tested electrode could eventually yield a specific dischargeable capacitance. Conversely, electrodes produced by the method embodied in the present invention proved that it could stably perform charging and discharging at a constant capacitance from the initial test immediately after being made up, and yet, it proved to yield the maximum discharge capacitance value. During comparative tests, the inventors charged these specimen electrodes for 15 consecutive hours applying 25 mA of the current density per gram of the hydrogen-stored alloy, whereas discharge operations were performed by applying 25 mA of the current density against the reference mercury monoxide electrode until −0.8 V of charge was left. FIG. 2 shows the polarization characteristics of hydrogen-stored electrodes each containing 50% charge. Curves $l_2$ and $l_3$ respectively show the electrical characteristics, indicating that the electrode embodied in the present invention improved polarization characteristics. FIG. 3 shows the variation of the dischargeable capacitance when the discharge rate was variable. Curves $l_2$ and $l_3$ respectively show the electrical characteristics. Results of these tests proved that the hydrogen-stored electrode embodied by the present invention actually showed quite satisfactory characteristics when a greater rate of discharge was applied with the resultant higher current density.

As is clear from the above, the hydrogen-stored electrode produced by the method reflecting the preferred embodiment proved to be extremely satisfactory in the electrical characteristics only because it effectively applies the activated hydrogen-stored alloy to the active electrode element, and as a result, such a unique electrode is extremely useful for application to the cathode of the alkaline battery and to electrodes of other appliances as well.

Another preferred version of the present invention is described below. In this version, the hydrogen-stored alloy is composed of the following: TiNi alloy for generating hydrogen through its reaction in such solution containing either acid or alkali, copper-aluminum and [Cu(NH3)4](OH)2 which is the transition metal ion complex, both being added to such solution containing potassium hydroxide. This method allows the use of the following elements: Transition metal ion complex to be added to solution may be comprised of a variety of transition metals in the core which is accompanied with such ligands including $NH_3$, $H_2O$, $CN^-$, $SCN^{31}$, and CO, or inorganic ligands, or EDTA, NH2CH2CH2NH2, or other organic ligands as well. By effectively using these, this embodiment is executed by the procedure described below.

First, weigh the TiNi alloy powder each having a maximum of 44 microns of the particle diameter and also the Laney alloy powder composed of copper and aluminum each having 50% share by weight so that the weight ratio becomes 5:3, and then blend these until homogenized. Next, prepare potassium hydroxide solution containing 30 g./liter of the transition metal ion complex [Cu(NH3)4](OH)2, then heat the solution to 70° C., and stir it well. Gradually add the blends of the TiNi alloy powder and the Laney Cu-Al alloy powder into the prepared solution. This causes aluminum of the Cu-Al alloy to react alkali, generating both aluminate ion and hydrogenated gas in solution. Even after all the blends have been added to the solution, its temperature should be held at 70° C. and the solution be stirred continuously until generation of the hydrogen gas ceases. During this process, the copper ammonium complex dissolves itself, causing ammonium gas to be generated. At the same time, copper particles start to precipitate themselves onto the surface of the activated hydrogen-stored alloy.

Figure 4:
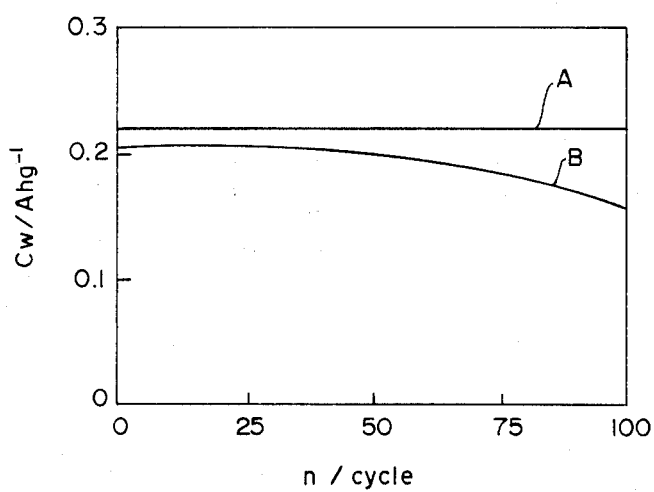
FIG. 4 shows the electrical characteristics in relation to the number of the charge-and-discharge cycles and the dischargeable capacitance of the hydrogen-stored electrode.

After all reactions are completed, alloy compounds are thoroughly washed with a sufficient volume of water, and clean water on the upper part of the solution is discharged after the water-soluble aluminated ion is no longer visible. Then, suspension is added to polytetrafluorethylene resin for preparing paste by sufficient stirring so that the content of this resin becomes 8% by weight. Next, fill up the current-collector punched nickel sheets with the prepared parts before compress-molding the paste with 1 MT/cm3 of pressure. The molded product is then subjected to a predrying process and then heat-treated at 300° C. for an hour, thus the hydrogen-stored electrode incorporating the TiNi cathode element is eventually completed. The inventors manufactured such hydrogen-stored electrodes by applying conventional processes for comparison with the hydrogen-stored electrodes embodied by the present invention from the viewpoint of their performance characteristics. Except for the difference in the manufacturing methods, all the requirements including the composition of the TiNi alloy, amount of bonding agent applied, amount of the conductive agent, molding pressure, and the heat-treatment temperature, were provided on the same basis. The attached drawings summarize the results of the evaluations of electrical characteristics carried out in the same electrolytic bath using a standard mercury monoxide electrode and the hydrogen-stored electrodes in comparison. FIG. 4 denotes the influence of the repeated charges and discharges over the amount of electricity discharged from the hydrogen-stored electrodes. Curve A represents the characteristics of the hydrogen-stored electrode embodied by the present invention, whereas curve B denotes the characteristics proven by the hydrogen-stored electrode made by the conventional process. These electrodes were charged for 7 consecutive hours by applying 40 mA of the current density per gram of the hydrogen-stored alloy, whereas discharge was done by applying 40 mA of the current density against the reference electrode until 0.75 V of charge remained. In conclusion, compared to such hydrogen-stored electrodes made by conventional processes, the new hydrogen-stored electrode embodied by the present invention provides much greater potentials for effectively using activated elements and longer service life. Consequently, the hydrogen-stored electrode embodied by the present invention is definitely advatageous for making up the cathode of alkaline batteries, and in addition, it securely maintains well-stabilized electrical characteristics, thus ensuring durable life.

What is claimed is:

1. A method for manufacturing a hydrogen-stored electrode, comprising:
   blending hydrogen stored alloy material with an additive;
   immersing said blend in a solution comprising acid or alkali to generate hydrogen gas in said solution by the chemical reaction of said additive and said solution, said hydrogen gas effecting hydrogenation and activation of said hydrogen-stored alloy material; and
   internally molding said blend to obtain a hydrogen-stored electrode.

2. The method of claim 1, wherein the molding step is preceded by the step of mixing a bonding agent with said blend.

3. The method of claim 1, which further comprises heat-treating the molded hydrogen-stored electrode.

4. The method of claim 1, wherein said solution contains a transition metal ion complex.

5. The method of claim 1, wherein said blend is in the form of a powder.

6. The method of claim 1, wherein the additive comprises a member selected from the group consisting of aluminum, nickel, copper and alloys thereof.

7. The method of claim 1, wherein the additive comprises a Laney alloy.

8. The method of claim 1, wherein the solution is a potassium hydroxide solution.

9. The method of claim 1, wherein the molding occurs by compression of the blend in a wet condition.

10. The method of claim 5, wherein the powder is a Ti-Ni powder.

11. The method of claim 4, wherein the transition metal ion complex is [Cu(NH3)4](OH)2.

12. The method of claim 2, wherein the bonding agent is polytetrafluroethylene resin.

13. The method of claim 3, wherein the heat-treatment occurs at about 300° C. for about one hour.

* * * * *